(12) United States Patent
Blatt et al.

(10) Patent No.: US 12,463,792 B2
(45) Date of Patent: Nov. 4, 2025

(54) ACCELERATED DIVISION OF HOMOMORPHICALLY ENCRYPTED DATA

(71) Applicant: Duality Technologies, Inc., Maplewood, NJ (US)

(72) Inventors: Marcelo Blatt, Modiin (IL); Yuval Harness, Ramat Hasharon (IL)

(73) Assignee: Duality Technologies, Inc., Maplewood, NJ (US)

( * ) Notice: Subject to any disclaimer, the term of this patent is extended or adjusted under 35 U.S.C. 154(b) by 322 days.

(21) Appl. No.: 17/851,552

(22) Filed: Jun. 28, 2022

(65) Prior Publication Data
US 2022/0416995 A1 Dec. 29, 2022

Related U.S. Application Data

(60) Provisional application No. 63/215,865, filed on Jun. 28, 2021.

(51) Int. Cl.
*H04L 9/00* (2022.01)
*G06F 17/17* (2006.01)

(52) U.S. Cl.
CPC .............. *H04L 9/008* (2013.01); *G06F 17/17* (2013.01); *H04L 2209/08* (2013.01)

(58) Field of Classification Search
CPC ........ G06F 17/10; G06F 17/147; G06F 17/17; G06F 21/602; G06F 21/6245; H04L 9/008
See application file for complete search history.

(56) References Cited

U.S. PATENT DOCUMENTS

| | | | |
|---|---|---|---|
| 11,558,172 B2* | 1/2023 | No .......................... | G06F 7/548 |
| 2016/0350648 A1* | 12/2016 | Gilad-Bachrach ....... | G06N 3/08 |
| 2017/0180115 A1* | 6/2017 | Laine .................... | H04L 9/0618 |
| 2020/0036510 A1* | 1/2020 | Gomez .................. | H04L 9/008 |
| 2020/0304293 A1* | 9/2020 | Gama ...................... | H04L 9/00 |
| 2021/0328766 A1* | 10/2021 | No ......................... | H04L 9/3093 |
| 2021/0336765 A1* | 10/2021 | No ........................ | H04L 9/0618 |
| 2021/0351913 A1* | 11/2021 | No .......................... | H04L 9/008 |
| 2022/0085972 A1* | 3/2022 | Jackson, II ............. | H04L 9/008 |
| 2022/0121952 A1* | 4/2022 | Ruiz ...................... | G06N 3/084 |

OTHER PUBLICATIONS

Han et al, Logistic Regression on Homomorphic Encrypted Data at Scale, The Thirty-First AAAI Conference on Innovative Applications of Artificial Intelligence (IAAAI-19) 2019, pp. 9466-9471 https://www.aaai.org/ois/index.php/AAAI/article/view/5000/4873.
Chialva, Diego and Dooms, Ann, Conditionals in Homomorphic Encryption, and Machine Learning Applications, May 9, 2019, 13 pages. https://arxiv.org/pdf/1810.12380.pdf.

* cited by examiner

*Primary Examiner* — Tae K Kim
(74) *Attorney, Agent, or Firm* — PEARL COHEN ZEDEK LATZER BARATZ LLP

(57) ABSTRACT

Methods and systems for performing an operation on at least one homomorphically encrypted ciphertext, the method include determining, by a computing device, a value that is an initial approximation of a result of the operation on the at least one homomorphically encrypted ciphertext; and iteratively improving, by the computing device, the value using a recurrence relation wherein a number of iterations is determined based on a predetermined accuracy to minimize an approximation error.

4 Claims, 4 Drawing Sheets

200

| |
|---|
| DETERMINING, BY A COMPUTING DEVICE, A VALUE THAT IS AN INITIAL APPROXIMATION OF A RESULT OF AN OPERATION ON AT LEAST ONE HOMOMORPHICALLY ENCRYPTED CIPHERTEXT |

202

| |
|---|
| ITERATIVELY IMPROVING, BY THE COMPUTING DEVICE, THE VALUE USING A RECURRENCE RELATION WHEREIN A NUMBER OF ITERATIONS IS DETERMINED BASED ON A PREDETERMINED ACCURACY TO MINIMIZE AN APPROXIMATION ERROR. |

```
┌─────────────────────────────────────┐
│   RECEIVING A FIRST VALUE, l,       │
│  CORRESPONDING TO A DEGREE OF       │
│         THE POLYNOMIAL              │── 302
│     APPROXIMATION TO BE             │
│          CALCULATED                 │
└─────────────────────────────────────┘
                  │
┌─────────────────────────────────────┐
│    RECEIVING A SECOND VALUE,        │
│   α, AND A THIRD VALUE, β,          │
│  WHEREIN THE SECOND VALUE           │
│ AND THE THIRD VALUE DEFINE A        │── 304
│   RANGE OVER WHICH THE              │
│ POLYNOMIAL APPROXIMATION IS         │
│        TO BE CALCULATED             │
└─────────────────────────────────────┘
                  │
┌─────────────────────────────────────┐
│ CALCULATING THE POLYNOMIAL          │
│  APPROXIMATION USING THE            │
│         EXPRESSION:                 │
```

$$\sum_{k=0}^{2^l} \left( \frac{a_{k-1}}{2} + \frac{a_{k+1}}{2} \right) T_k(\xi(x))$$

WHEREIN $a_k^{(l)} = 2\xi_0 a_{k+1}^{(l)} + a_{k+2}^{(l)}$
FOR $k = 2^l - 3, 2^l - 4, \ldots, 1, 0$,
WHEREIN $\xi(x) = 1 - 2\frac{\beta - x}{\beta - \alpha}$, AND
WHEREIN $T_k(x)$ IS A CHEBYSHEV
POLYNOMIAL OF THE FIRST KIND OF
DEGREE $k$.

ACCELERATED DIVISION OF HOMOMORPHICALLY ENCRYPTED DATA

CROSS-REFERENCE TO RELATED APPLICATIONS

This application claims the benefit of and priority to U.S. Provisional Patent Application No. 63/215,865 filed Jun. 28, 2021, which is owned by the assignee of the instant application and incorporated herein by reference in its entirety.

FIELD OF THE INVENTION

The invention relates generally to inversion operations on homomorphically encrypted data, in particular division.

BACKGROUND

Homomorphic encryption (HE) can allow many computations to be performed securely over encrypted data, without decrypting and/or exposing the underlying data. However, computations performed over HE data can be significantly more complex and time-consuming than, for example, their plaintext counterparts. In particular many HE schemes fail to support certain operations (e.g., inversion operations such as division).

In some existing HE schemes a numerator and denominator are determined, the numerator and denominator are decrypted, and the division is performed on the unencrypted data between the plaintext numerator and the plaintext denominator. Decryption of the numerator and denominator can reveal sensitive information, such as person information, presenting a security issue. Accordingly, it can be desired to perform operations such as division on HE data which can allow for performing the operation while the data is encrypted.

SUMMARY

Embodiments of the invention provide a technique to accelerate processor execution of computations over homomorphically encrypted data. Further, embodiments of the invention may improve the accuracy of numerical approximations for those computations. Embodiments of the invention may have the additional advantage of increased data security because the data used by embodiments of the invention does not need to be decrypted in order to perform the computation.

According to one or more embodiments, there is provided a method for performing an operation on at least one homomorphically encrypted ciphertext, the method including: determining, by a computing device, a value that is an initial approximation of a result of the operation on the at least one homomorphically encrypted ciphertext; and iteratively improving, by the computing device, the value using a recurrence relation wherein a number of iterations is determined based on a predetermined accuracy to minimize an approximation error.

According to some embodiments, the predetermined accuracy is based on a word length of the computing device.

According to some embodiments, the approximation error is a uniform relative error.

According to some embodiments, the operation is division.

According to some embodiments, the recurrence relation is a modified Newton iteration recurrence relation.

According to some embodiments, the modified Newton iteration recurrence relation is given by the formula: $y_{l+1} = y_l + \gamma_l \cdot y_l (\sigma_l - x \cdot y_l)$ wherein $\gamma_l$ is a predefined natural number and $\sigma_l$ is a predefined number greater than zero.

According to some embodiments, $\gamma_l \ll 1$ and $\sigma_l \ll 1$.

According to some embodiments, a sequence $(\gamma_1, \sigma_1), (\gamma_2, \sigma_2), \ldots$, is obtained by training using at least one of: random testing; and selection based on a fitness function.

According to one or more embodiments, there is provided a method for calculating a polynomial approximation of 1/x for a homomorphically encrypted ciphertext x, the method including: receiving a first value, l, corresponding to a degree of the polynomial approximation to be calculated; receiving a second value, $\alpha$, and a third value, $\beta$, wherein the second value and the third value define a range over which the polynomial approximation is to be calculated; and calculating the polynomial approximation using the expression:

$$\sum_{k=0}^{2^l} \left( \frac{a_{k-1}}{2} + \frac{a_{k+1}}{2} \right) T_k(\xi(x))$$

wherein $a_k^{(l)} = 2\xi_0 a_{k+1}^{(l)} + a_{k+2}^{(l)}$ for $k = 2^l - 3, 2^l - 4, \ldots, 1, 0$, wherein $$\xi(x) = 1 - 2\frac{\beta - x}{\beta - \alpha},$$

and wherein $T_k(x)$ is a Chebyshev polynomial of the first kind of degree k.

According to some embodiments, 0 is included in the range defined by the second value and the third value.

According to one or more embodiments, there is provided a system for performing an operation on at least one homomorphically encrypted ciphertext, the system comprising at least one processor and a memory containing instructions which, when executed by the at least one processor, cause the at least one processor to: determine a value that is an initial approximation of a result of the operation on the at least one homomorphically encrypted ciphertext; and iteratively improve the value using a recurrence relation wherein a number of iterations is determined based on a predetermined accuracy to minimize an approximation error.

According to some embodiments, the predetermined accuracy is based on a word length of the at least one processor.

According to some embodiments, the approximation error is a uniform relative error.

According to some embodiments, the operation is division.

According to some embodiments, the recurrence relation is a modified Newton iteration recurrence relation.

According to some embodiments, the modified Newton iteration recurrence relation is given by the formula: $y_{l+1} = y_l + \gamma_l \cdot y_l (\sigma_l - x \cdot y_l)$ wherein $\gamma_l$ is a predefined natural number and $\sigma_1$ is a predefined number greater than zero.

According to some embodiments $\gamma_l \gg 1$ and $\sigma_l \ll 1$.

According to some embodiments, a sequence $(\gamma_1, \sigma_1), (\gamma_2, \sigma_2), \ldots$, is obtained by training using at least one of: random testing; and selection based on a fitness function.

According to one or more embodiments, there is provided a system for calculating a polynomial approximation of 1/x for a homomorphically encrypted ciphertext x, the system comprising at least one processor and a memory containing instructions which, when executed by the at least one processor, cause the at least one processor to: receive a first value, l, corresponding to a degree of the polynomial approximation to be calculated; receive a second value, α, and a third value, β, wherein the second value and the third value define a range over which the polynomial approximation is to be calculated; and calculate the polynomial approximation using the expression:

$$\sum_{k=0}^{2^l} \left(\frac{a_{k-1}}{2} + \frac{a_{k+1}}{2}\right) T_k(\xi(x)),$$

wherein $a_k^{(l)} = 2\xi_0 a_{k+1}^{(l)} + a_{k+2}^{(l)}$ for $k=2^l-3, 2^l-4, \ldots, 1, 0$, wherein $$\xi(x) = 1 - 2\frac{\beta - x}{\beta - \alpha},$$

and wherein $T_k(x)$ is a Chebyshev polynomial of the first kind of degree k.

According to some embodiments, 0 is included in the range defined by the second value and the third value.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

FIG. 1 is a flow chart of a method for performing an operation on homomorphically encrypted ciphertext, according to some embodiments of the invention;

FIG. 2 is a flowchart of a method for calculating a polynomial approximation of 1/x for a homomorphically encrypted ciphertext x, according to some embodiments of the invention;

Figure 3A:
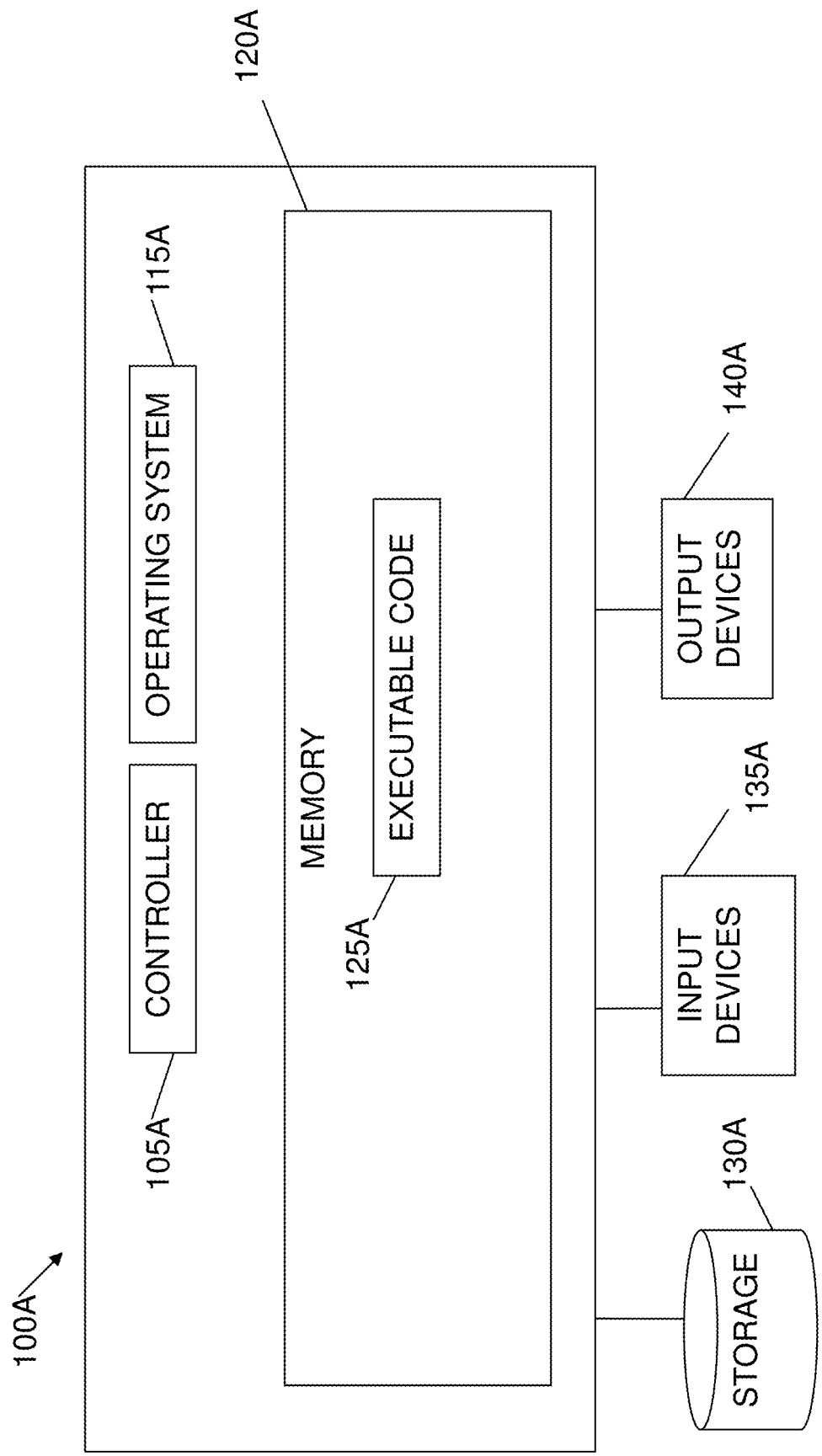
FIG. 3A is a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In general, the invention can provide efficient and/or secure systems for performing computations in a homomorphically encrypted environment implementing accelerated algorithms for division for HE schemes. It will be understood that the methods and systems presented herein may be used for other mathematical operations/functions similar to division, e.g., matrix inversion.

In general, the invention can provide two methods for approximating the function $f(x)=1/x$. The first method can relate to accelerated Newton iterations, and the second method can relate to minimax polynomial approximation. Both methods can produce a polynomial approximation minimizing the uniform relative error, as shown below in EQN. 1:

$$\max_{p_n(x) \in \mathbb{R}_n[x]} \frac{|1/x - p_n(x)|}{|1/x|} = \max_{p_n(x) \in \mathbb{R}_n[x]} |1 - x \cdot p_n(x)| \qquad \text{EQN. 1}$$

where $\mathbb{R}_n[x]$ denotes a set of polynomials with real coefficients whose degree is less than or equal to n. This criterion can be of relevance to HE computations due to, for example, the magnitude of the approximated function being, in general, unavailable for HE evaluated functions. In some embodiments relating to the minimax polynomial approximation method, the minimax polynomial approximation method of the invention can differ from standard minimax approximation techniques typically used in the prior art, which typically aim to minimize the uniform absolute error. The minimax polynomial approximation method of the invention can aim to minimize the uniform relative error. Minimizing the uniform relative error may allow greater choice of parameter selection.

FIG. 1 is a flowchart of a method 200 for performing (e.g., via computing device 100A shown in FIG. 3A herein) an operation on at least one homomorphically encrypted ciphertext, according to some embodiments of the invention. The operation can be division, matrix inversion, logarithm, cosine, sine, and/or any function capable of being approximated by polynomials, or any combination thereof.

According to some embodiments, method 200 includes determining (e.g., via computing device 100A as shown below in FIG. 3A), a value that is an initial approximation of a result of the operation on the at least one homomorphically encrypted ciphertext (Step 202).

The value may be input by a user and/or determined automatically by the computing device. A value that is an initial approximation of a result of the operation may be a naïve guess of the result of the operation. For example, an initial approximation of the result of the division 5/2 may be 4, because 4 is less than 5.

According to some embodiments, method 200 includes iteratively improving (e.g., via the computing device 100A as shown above in FIG. 3A) the value using a recurrence relation, wherein a number of iterations is determined based on a predetermined accuracy to minimize an approximation error (Step 204).

The predetermined accuracy can be based on a word length of the computing device. For example, the predetermined accuracy may be based on the 64 bit word length of current computer processors. In general the predetermined accuracy can be based on the needs of the application.

According to some embodiments, the recurrence relation corresponds to simulated annealing. According to some embodiments, the recurrence relation is a modified Newton iteration recurrence relation.

Typically, Newton iterations for the division problem can be defined by the relation as shown below in EQN. 2:

$$y_{l+1} = y_l - \frac{g(y_l)}{g'(y_l)} = y_l(2 - x \cdot y_l), \quad g(y) = x - \frac{1}{y} \qquad \text{EQN. 2}$$

where the initial approximation $y_0(x) \approx 1/x$ can be predetermined according to the interval of values [a, b]. Typically, $y_0(x)$ is set to as a low-order minimax polynomial approximation. For the case 0<a<b, setting a constant initial guess $y_0(x)=c_0 \in \mathbb{R}$ where $$b \cdot c_0 \in (1-\epsilon, 1+\epsilon), \epsilon \in [0,1) \quad \text{EQN. 3}$$

can ensure convergence and produce a polynomial of degree $2^l$ at iteration $l \in \mathbb{N}$.

The acceleration of Newton iterations away from zero can be achieved by modifying the Newton iteration recurrence relation in a manner that can accelerate a departure from zero, according to some embodiments of the invention. The modified Newton iteration recurrence relation may be referred to as an accelerated Newton iteration recurrence relation. According to some embodiments, the Newton iteration recurrence relation is modified as shown below in EQN. 4:

$$y_{l+1}=y_l+\gamma_l \cdot y_l(\sigma_l - x \cdot y_l), \gamma_l \in \mathbb{N}, \sigma_l > 0 \quad \text{EQN. 4}$$

Note that for $\gamma_l=\sigma_l=1$ the accelerated Newton iteration recurrence relation reduces to the Newton iteration recurrence relation shown in EQN. 2. As shown in EQN. 4, setting large values (e.g., >>1) for the gamma and small values (e.g., <<1) for the sigma at the initial iterations can effectively accelerate the slow departure from zero. A total number of required iterations can be reduced compared to, for example, the conventional approach of EQN. 2. Imposing $\gamma_l \in \mathbb{N}$ can reduce a required number of homomorphic multiplications required at each iteration to one to, for example, reduce a computational complexity of the execution of the operation. Setting excessively large values for $\gamma_l$ (e.g. anything where $\gamma_l \in \mathbb{N}$ does not hold) can lead to instability (e.g. a failure to converge to a single value), and should therefore be avoided.

In some embodiments, for any given range of values [a, b], an acceleration sequence $(\gamma_1, \sigma_1), (\gamma_2, \alpha_2), \ldots,$ can be obtained by training (e.g. random testing and selection based on a fitness function). Typically, $\gamma_l \in \{1, 2, \ldots, 8\}$ where for sufficiently large l, $\gamma_l \in \{1\}$, in other words $\gamma_l=1 \; \forall l \geq l_0$. Thus, for any given sequence $\{\sigma_l\}$ the training for $\{\gamma_l\}$ may be implemented using a simple search over all options.

Table 1 shows pseudocode for the accelerated Newton iteration method, according to embodiments of the invention.

An initial approximation, e.g. the value that is an initial approximation of the result of the operation, may be set as $y_0=1/b$. According to some embodiments, the value that is an initial approximation is generated using pseudocode as shown in Table 2 below.

FIG. 2 shows a flowchart of a method 300 for calculating a polynomial approximation of $1/x$ for a homomorphically encrypted ciphertext x (e.g., via computing device 100A shown below in FIG. 3A).

Method 300 may include receiving a first value, l, corresponding to a degree of the polynomial approximation to be calculated (Step 302). The first value l can be low (e.g., less than 10), corresponding to a low degree polynomial because, for example, low degree polynomials have less computational complexity and/or accumulated encryption noise. According to some embodiments, polynomials of degree 7 are used.

Method 300 may include receiving a second value, $\alpha$, and a third value, $\beta$, wherein the second value and the third value define a range over which the polynomial approximation is to be calculated (Step 304). For example the polynomial approximation may be calculated over one of the ranges $(\alpha,\beta),(\alpha,\beta],[\alpha,\beta),$ or $[\alpha,\beta]$.

Method 300 may include calculating the polynomial approximation using the expression as shown below in EQN. 5:

$$\sum_{k=0}^{2^l} \left( \frac{a_{k-1}}{2} + \frac{a_{k+1}}{2} \right) T_k(\xi(x)), \quad \text{EQN. 5}$$

wherein $a_k^{(l)}=2\xi_0 a_{k+1}^{(l)}+a_{k+2}^{(l)}$ for $k=2^l-3, 2^l-4, \ldots, 1, 0$, wherein $$\xi(x) = 1 - 2\frac{\beta - x}{\beta - \alpha},$$

and wherein $T_k(x)$ is a Chebyshev polynomial of the first kind of degree k (Step 306).

Assuming $|x| \geq 1$ the optimal polynomial approximation whose degree is less than or equal to some predetermined $n \in \mathbb{N}$ with respect to the relative error satisfies the following minimax problem as shown below in EQN. 6:

TABLE 1

Algorithm 1 Accelerated Newton Iterations

```
Ensure: 0 < a < b and L ∈ N (x ∈ |a, b| is assumed)
Ensure: γₗ ∈ N and σₗ > 0 for all l = 0, 1, . . . , L - 1
   1:    procedure A_CCEL N_EWT(a, b, x, y₀, L, {(γₗ,σₗ)}_{l=0}^{L-1})
   2:        z₀ ← x * y₀
   3:        for ℓ = 1, 2, . . . , L do
   4:            [yℓ, dℓ] ← [yℓ₋₁, yℓ₋₁ * (σℓ₋₁ - zℓ₋₁)]
   5:            [zℓ, eℓ] ← [zℓ₋₁, zℓ₋₁ * (σℓ₋₁ - zℓ₋₁)]
   6:            for m = 1, . . . , γℓ₋₁ do
   7:                yℓ ← yℓ + dℓ
   8:                zℓ ← zℓ + eℓ
   9:            end for
  10:       end for
  11:       return y_L
  12:   end procedure
```

$$\hat{p}_n(x) = \arg\min_{p_n(x) \in \mathbb{R}_n[x]} \max_{x \in [a,b]} |1 - x \cdot p_n(x)| \qquad \text{EQN. 6}$$

The solution to the minimax problem for the case $0 \notin [a, b]$ can be available from a result in approximation theory. For example, let $[a, b]$ be a non-empty interval in R and let $\tau \notin [a, b]$, then the minimum, as shown in EQN. 7:

$$\min_{\phi(x) \in \mathbb{R}_n(x), \phi(\tau)=1} \max_{x \in [a,b]} |\phi(x)| \qquad \text{EQN. 7}$$

can be attained by the polynomial, as shown in EQN. 8:

$$\hat{\phi}_n(x; a, b, \tau) = \frac{T_n\left(1 + 2\frac{x-b}{b-a}\right)}{T_n\left(1 + 2\frac{\tau-b}{b-a}\right)} \qquad \text{EQN. 8}$$

where $T_n(x)$ denotes a Chebyshev polynomial of the first kind of degree n.

Since the polynomial $\phi(x) = 1 - x \cdot p_n(x)$ can satisfies $\phi(0) = 1$, setting $\tau = 0$ can imply that the optimal solution to the minimax problem given in EQN. 6 can be given by EQN 9:

$$\hat{p}_n(x) = \frac{1}{x} \cdot \left(1 - \frac{T_n\left(1 - 2\frac{b-x}{b-a}\right)}{T_n\left(1 - 2\frac{b}{b-a}\right)}\right) \qquad \text{EQN. 9}$$

Denoting:

$$\hat{\psi}_l(x) = \hat{p}_{2^l}(x) = \frac{1}{x}\left(\frac{C_l(x)}{C_l(0)}\right), \; C_l(x) = T_{2^l}(\xi(x)) \qquad \text{EQN. 10}$$

where $$\xi(x) = 1 - 2\frac{b-x}{b-a},$$

using the identity as shown in EQN. 11:

$$C_{l+1}(x) = T_{2^{l+1}}(\xi(x)) = 2C_l^2(x) - 1 \qquad \text{EQN. 11}$$

EQN 12 can follow:

$$\hat{\psi}_{l+1}(x) = \frac{2C_l(0)}{C_{l+1}(0)} \cdot \left(C_l(x) + C_l(0) \cdot \hat{\psi}_l(x)\right)$$
$$= \left(1 + \frac{1}{C_{l+1}(0)}\right) \cdot \left(2 - x \cdot \hat{\psi}_l(x)\right) \cdot \hat{\psi}_l(x) \qquad \text{EQN. 12}$$
$$= \hat{\psi}_l(x) + \gamma_l \cdot \left(\sigma_l - x \cdot \hat{\psi}_l(x)\right) \cdot \hat{\psi}_l(x)$$

Thus, $$\gamma_l = 1 + \frac{1}{C_{l+1}(0)} = \frac{2C_l^2(0)}{2C_l^2(0) - 1}, \qquad \text{EQN. 13}$$
$$\sigma_l = 2 - \frac{1}{\gamma_l} = 1 + \frac{1}{C_l^2(0)}$$

which, except for the restriction $\gamma_l \in \mathbb{N}$, can agree with the accelerated Newton iterations formula in EQN. 6. As l increases, $C_l(0)$ eventually increases exponentially. For sufficiently large l the recurrence relation can effectively coincide with the Newton iterations recurrence relation of EQN. 2.

Denoting:

$$\xi_0 = \xi(0) = -\frac{b+a}{b-a}, \qquad \text{EQN. 14}$$
$$x(\xi) = \frac{b+a}{2} + \frac{b-a}{2}\xi = \frac{b-a}{2}(\xi - \xi_0)$$

then the formula for the Chebyshev polynomials approximation can be as shown in EQN. 15 below:

$$\hat{\psi}_l(x) = \frac{a_0^{(l)}}{2} + \sum_{k=1}^{2^l - 1} a_k^{(l)} T_k(\xi(x)), \qquad \text{EQN. 15}$$
$$\forall x \in (a, b)$$

and can satisfy EQN 16 as shown below:

$$\frac{b-a}{2}(\xi - \xi_0)\hat{\psi}_l(\xi) = 1 - \frac{T_{2^l}(\xi)}{T_{2^l}(\xi_0)}. \qquad \text{EQN. 16}$$

Employing EQN 17 as shown below:

$$2T_j(\xi) \cdot T_k(\xi) = T_{j+k}(\xi) + T_{|j-k|}(\xi) \qquad \text{EQN. 17}$$

then $$\xi \cdot \left(\frac{a_0}{2} + \sum_{k=1}^{2^{l+1}-1} a_k T_k(\xi)\right) = \sum_{k=0}^{2^l}\left(\frac{a_{k-1}}{2} + \frac{a_{k+1}}{2}\right)T_k(\xi) \qquad \text{EQN. 18}$$

where $a_k = 0$ for all $k \in \{0, 1, \ldots, 2^{l-1}\}$. Thus, the recurrence relation for the coefficients is obtained as shown below in EQN. 18:

$$a_k^{(l)} = 2\xi_0 a_{k+1}^{(l)} + a_{k+2}^{(l)}, k = 2^l - 3, 2^l - 4, \ldots, 1, 0 \qquad \text{EQN. 19}$$

which can satisfy initial conditions as shown below in EQN. 20 and EQN. 21:

$$a_{2^l-1}^{(l)} = \frac{4}{b-a} \cdot \frac{-1}{T_{2^l}(\xi_0)}, \qquad \text{EQN. 20}$$

$$a_{2^l-2}^{(l)} = \frac{4}{b-a} \cdot \frac{-2\xi_0}{T_{2^l}(\xi_0)} \qquad \text{EQN. 21}$$

as well as the consistency condition as shown in EQN. 22 below:

$$a_1^{(l)} - \xi_0 a_0^{(l)} = \frac{4}{b-a} \qquad \text{EQN. 22}$$

Table 2 shows an algorithmic implementation (e.g., pseudocode) of a recursive formula for generating the polynomial approximation $\hat{p}_n(x)$ according to embodiments of the invention.

TABLE 2

Algorithm 2 Relative Error Minimax Division

```
Ensure: 0 < a < b and L ∈ ℕ (x ∈ [a, b] is assumed)
1:      procedure REM₂D_f(a, b, x, L)
2:        ξ₀ ← -(b + a)/(b - a)
3:        a ← [0, . . . , 0, 8 * ξ₀/(a - b)/T_{2L}(ξ₀), 4/(a - b)/T_{2L}(ξ₀)]    ▷ 2^L slots
4:        for k = 2^L - 3, 2^L - 4, . . . , 1, 0 do
5:          a[k] ← 2 * ξ₀ * a[k + 1] + a[k + 2]
6:        end for
7:        return a
8:      end procedure
```

The returned outcome "a" may be an array (e.g., ordered list) containing the coefficients for the polynomial approximation. Following a convention in computing of counting starting with 0, the first value in the array (position 0) may be the coefficient for the $0^{th}$ power of x in the polynomial, e.g., $x^0=1$ in other words a constant, the second value in the array (position 1) may be the coefficient for the first power of x, e.g. $x^1=x$, the third value in the array may be the coefficient for the second power of x, e.g. $x^2$, and so on.

If $|T_{2^l}(\xi_0)|\ll 1$, algorithm 2 may be combined with algorithm 1, for example by using the polynomial approximation of algorithm 2 as the initial approximation of algorithm 1.

Embodiments of the invention can attain a significant reduction of total number of homomorphic multiplications compared to current state of the art techniques. For $n=2^l$ embodiments of the invention relating to accelerated Newton iterations can achieve a multiplicative depth $l=\log_2(n)$ or $l+1$, and a total number of homomorphic operations l or $l+1$. Embodiments of the invention relating to minimax polynomial approximation can achieve a multiplicative depth $l=\log_2(n)$, and/or a total number of homomorphic operations $C(n_0)=l-l_0$. The term $n_0=2^{l_0}$ denotes a predetermined number based on the parameters of the problem and $C(n_0)$ denotes the number of homomorphic multiplications needed to estimate a polynomial of degree $n_0$, for example in Chebyshev series representation. Based on the analysis of the minimax approximation for the relative error, embodiments of the invention may be analytically optimal, and thus can set a limit for the best accuracy attainable for a given bound for the multiplicative depth.

Embodiments of the invention can be applicable to any range of values [a, b], including range of values containing zero. Let $x\in [a, b]\dagger\{0\}$, and let $d\in \mathbb{N}$ denote a predetermined bound for the multiplicative depth. The goal of division algorithms according to embodiments of the invention is to obtain a low complexity polynomial approximation, $p_n(x)\approx 1/x$, minimizing the error in some appropriate norm given a predetermined multiplicative depth bound, d.

In some embodiments, either $0\in (a, b)$ or one of the interval bounds (a or b) can be arbitrarily close to 0. In these embodiments, $\inf_{x\in(a,b)}|x|\ll 1$ and the division by x is numerically unstable and can produce an unreliable result. Assuming a scaling factor $\delta>1$ such that:

If $0<a<1$ then $[\delta a, \delta b]=[1, \beta]$
If $-1<b<0$ then $[\delta a, \delta b]=[\alpha, -1]$ If $a<0<b$ then $[\delta a, \delta b]=[\alpha, \beta]$ such that $\mathbb{P}(|x|<1/\delta)\ll 1$, where $\mathbb{P}(A)$ denotes the probability of event A
Hence, approximating $\pi(\xi)\approx 1/\xi$ where $\xi=\delta x$ effectively reduces the problem to obtaining an approximation for $1/\xi$ where $|\xi|\geq 1$. The original approximation may be recovered by setting $p_n(x)=\delta\cdot\pi(\xi)\approx 1/x$. A drawback of such a rescaling is the added multiplicative depth overhead, however, the rescaling serves several practical purposes in addition to avoiding division by a small number:

The analysis is readily applicable for division by a natural number, a particular yet important application;

The approximated function $f(x)=1/x$ and all its derivative are well bounded. Thus the existence of an accurate approximation is ensured;

The absolute error can be bounded by a relative error as is shown below in EQN. 22:

$$|1/x - p_n(x)| \leq \frac{|1/x - p_n(x)|}{|1/x|} = |1 - x\cdot p_n(x)| \; \forall \; |x| \geq 1 \qquad \text{EQN. 22}$$

which implies it can be sufficient to minimize the relative error $|1-x\cdot p_n(x)|$.

The last point can be importance for HE computations. In the general case, the aim can be to minimize either the absolute error or the relative error based on the estimated magnitude of the approximated function. Such an estimate of the magnitude may not available for a HE evaluated function.

One concern for division by polynomial approximations can be the sensitivity to numerical underflow/overflow, e.g. what happens in contrast to assumptions $|x|<1$ (underflow) or $|x|>\max\{|a|, |b|\}$ (overflow). Typically, when $|x|>\max\{|a|, |b|\}$ the approximation error can become very large (e.g. sufficiently large to prevent correct decryption) even when the deviation is small. High sensitivity to numerical overflow can be avoided by taking a larger interval for evaluating the approximation. However, this comes at the expense of accuracy: expanding the interval [a, b] requires larger multiplicative depth to achieve the same accuracy as the original interval. In other words, there can be a trade-off between the accuracy of the approximation within the interval [a, b] and the stability of the method with respect to numerical underflow/overflow.

For the case $0 \in [a, b]$, denote $c=\max\{|a|, |b|\}$ and consider an odd approximation, $p_n(x)=-p_n(-x)\approx 1/x$, $x\in [-c, c]$. Thus, for another polynomial approximation whose domain of application is contained in the set of positive of positive real numbers, $\hat{q}_m(x)\approx 1/x$, $x\in (\epsilon^2, c^2)$, $\epsilon\in (0, c)$, $\deg(\hat{q}_m(x))=m\in \mathbb{N}$, there exists the approximation as shown below in EQN. 24:

$$\hat{q}_{2m+1}(x)=x\cdot\hat{q}_m(x^2)\approx 1/x, x\in [-c,-\epsilon]\cap[c,\epsilon] \qquad \text{EQN. 24}$$

Effectively, the problem can reduce to the approximation of $f(x)=1/x$ for the case $0\notin [a, b]$ with $c=b>a=\epsilon>0$.

FIG. 3A shows a block diagram of an exemplary computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system.

Operating system 115A may be or may include code to perform tasks involving coordination, scheduling, arbitration, or managing operation of computing device 100A, for example, scheduling execution of programs. Memory 120A may be or may include, for example, a Random Access Memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store for example, instructions (e.g. code 125A) to carry out a method as disclosed herein. Memory 120A may use a datastore, such as a database.

Executable code 125A may be any application, program, process, task, or script. Executable code 125A may be executed by controller 105A possibly under control of operating system 115A. For example, executable code 125A may be, or may execute, one or more applications performing methods as disclosed herein, such as a machine learning model, or a process providing input to a machine learning model. In some embodiments, more than one computing device 100A or components of device 100A may be used. One or more processor(s) 105A may be configured to carry out embodiments of the present invention by for example executing software or code.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage. Storage 130A may include storing data in a database.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g. memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 3B:
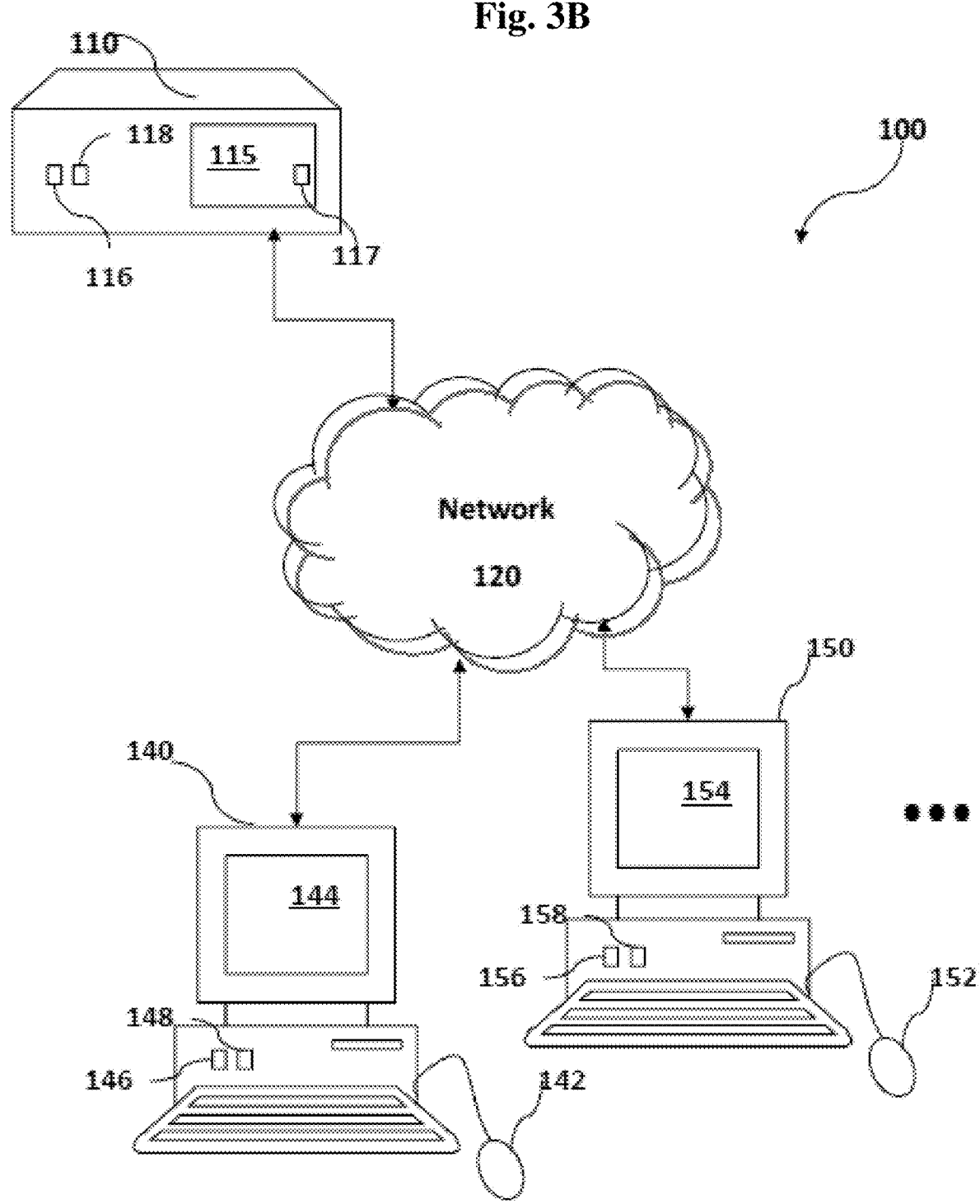
FIG. 3B is schematic drawing of a system, according to some embodiments of the invention.

FIG. 3B is a schematic drawing of a system 100 according to some embodiments of the invention. System 100 may include one or more server(s) 110, database(s) 115, and/or computer(s) 140, 150, . . . , etc. Any or all of system 100 devices may be connected via one or more network(s) 120. Network 120, which connects server(s) 110 and computers 140 and 150, may be any public or private network such as the Internet. Access to network 120 may be through wire line, terrestrial wireless, satellite or other systems well known in the art.

Server(s) 110 and computers 140 and 150, may include one or more controller(s) or processor(s) 116, 146, and 156, respectively, for executing operations according to embodiments of the invention and one or more memory unit(s) 118, 148, and 158, respectively, for storing data (e.g., encryption and/or decryption keys, and encrypted and/or decrypted data) and/or instructions (e.g., software for applying computations or calculations, keys to encrypt or decrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 140 and 150 may include one or more input devices 142 and 152, respectively, for receiving input from a user (e.g., via a pointing device, click-wheel or mouse, keys, touch screen, recorder/microphone, other input components). Computers 140 and 150 may include one or more output devices 144 and 154 (e.g., a monitor or screen) for displaying data to a user provided by or for server(s) 110.

Database 115 may include software processes or applications for storing and retrieving data 117 such as large-word data structures and large-work CKKS computations, and/or encryption and/or decryption keys. Data 117 may also include code (e.g., software code) or logic, e.g., to enable the application of large-work CKKS algorithms according to embodiments of the invention. Database 115 may be internal or external to one or more of server(s) 110 and/or computer(s) 140 and/or 150 (not shown) and may be connected thereto by a local or remote and a wired or wireless connection. In some embodiments, data 117 is stored in an alternate location separate from database 115, e.g., memory unit(s) 118, 148, and/or 158.

Any of system 100 devices may operate as a secure or insecure party. Secure parties may each securely store unencrypted (or encrypted) data and private keys associated with each dataset, party, etc. Insecure parties may not access the unencrypted data or private keys.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method executed at multiple computing devices connected via one or more network(s), the method comprising:

at a first computing device of the multiple computing devices:

securely storing unencrypted data and one or more private keys;

homomorphically encrypting the unencrypted data using the one or more private keys to generate a homomorphic encrypted ciphertext x;

at a second computing device of the multiple computing devices:

receiving, from the first computing device, over the one or more network(s) connecting the multiple computing devices, the homomorphic encrypted ciphertext x;

calculating a polynomial approximation of 1/x for a homomorphically encrypted ciphertext x without decrypting the denominator x of the polynomial approximation by:

receiving a first value, l, corresponding to a degree of the polynomial approximation to be calculated;

receiving a second value, $\alpha$, and a third value, $\beta$, wherein the second value and the third value define a range over which the polynomial approximation is to be calculated; and calculating the polynomial approximation of 1/x for the homomorphically encrypted ciphertext x using the expression using the expression:

$$\sum_{k=0}^{2^l} \left(\frac{a_{k-1}}{2} + \frac{a_{k+1}}{2}\right) T_k(\xi(x))$$

wherein $a_k^{(l)} = 2\xi_0 a_{k+1}^{(l)} + a_{k+2}^{(l)}$ for $k = 2^l - 3, 2^l - 4, \ldots, 1, 0,$ wherein $$\xi(x) = 1 - 2\frac{\beta - x}{\beta - \alpha},$$

and wherein $T_k(x)$ is a Chebyshev polynomial of the first kind of degree K.

2. The method of claim 1, wherein 0 is included in the range defined by the second value and the third value.

3. A system comprising:
one or more network(s) connecting multiple computing devices;
a first computing device of the multiple computing devices comprising at least one processor and a memory containing instructions which, when executed by the at least one processor, cause the at least one processor to:
securely store unencrypted data and one or more private keys, and
homomorphically encrypt the unencrypted data using the one or more private keys to generate a homomorphic encrypted ciphertext x; and
a second computing device of the multiple computing devices comprising at least one processor and a memory containing instructions which, when executed by the at least one processor, cause the at least one processor to:
receive, from the first computing device, over the one or more network(s) connecting the multiple computing devices, the homomorphic encrypted ciphertext x;
calculate a polynomial approximation of 1/x for a homomorphically encrypted ciphertext x without decrypting the denominator x of the polynomial approximation by:
receiving a first value, l, corresponding to a degree of the polynomial approximation to be calculated;
receiving a second value, $\alpha$, and a third value, $\beta$, wherein the second value and the third value define a range over which the polynomial approximation is to be calculated; and
calculating the polynomial approximation of 1/x for a homomorphically encrypted ciphertext x using the expression:

$$\sum_{k=0}^{2^l} \left(\frac{a_{k-1}}{2} + \frac{a_{k+1}}{2}\right) T_k(\xi(x))$$

wherein $a_k^{(l)} = 2\xi_0 a_{k+1}^{(l)} + a_{k+2}^{(l)}$ for $k = 2^l + 3, 2^l - 4, \ldots, 1, 0$,
wherein $$\xi(x) = 1 - 2\frac{\beta - x}{\beta - \alpha},$$

and wherein $T_k(x)$ is a Chebyshev polynomial of the first kind of degree k.

4. The system of claim 3, wherein 0 is included in the range defined by the second value and the third value.

* * * * *